United States Patent [19]

Delatush

[11] 4,334,812
[45] Jun. 15, 1982

[54] ADJUSTABLE CONTAINER BULKHEAD ASSEMBLY

[75] Inventor: John J. Delatush, Freehold, N.J.

[73] Assignee: The United States of America as represented by the Secretary of the Navy, Washington, D.C.

[21] Appl. No.: 63,605

[22] Filed: Aug. 3, 1979

[51] Int. Cl.³ .......................... B60P 1/64; B60P 7/14; B61D 45/00; B63B 25/24
[52] U.S. Cl. ..................................... 410/52; 206/478; 206/583; 220/1.5; 410/128; 410/140
[58] Field of Search ............... 410/121, 127, 128, 129, 410/130, 140, 52; 206/478, 583; 220/1.5; 254/334, 337

[56] References Cited

U.S. PATENT DOCUMENTS

| | | | |
|---|---|---|---|
| 2,017,301 | 10/1935 | Wynn | 410/128 |
| 2,720,849 | 10/1955 | Prati | 410/128 |
| 3,371,815 | 3/1968 | Macomber | 220/1.5 |
| 3,437,222 | 4/1969 | Sause, Jr. | 410/128 |
| 3,502,205 | 3/1970 | Milton | 206/478 |
| 3,784,054 | 1/1974 | Mautz | 220/1.5 X |
| 3,863,799 | 2/1975 | Thomaswick et al. | 220/1.5 |
| 3,934,855 | 1/1976 | Patterson et al. | 254/337 X |
| 4,062,520 | 12/1977 | Patterson et al. | 254/334 X |
| 4,082,044 | 4/1978 | Day | 410/128 |
| 4,161,145 | 7/1979 | Patterson et al. | 410/130 |

*Primary Examiner*—Joseph F. Peters, Jr.
*Assistant Examiner*—Howard Beltran
*Attorney, Agent, or Firm*—R. S. Sciascia; Henry Hansen

[57] ABSTRACT

A universal cargo restraint system for an intermodal shipping container. Each of four restraint cables are connected at the one end thereof to one of the corners of the container front panel and extend rearwardly to a movable rear bulkhead. The other end of each cable includes a threaded rod extending through a selected one of a plurality of holes at the sides of the bulkhead. Nuts adjustable along the length of the rod urge the bulkhead against the cargo within the container. Dunnage and shims positioned about the cargo provide to bracing against to-and-fro and sway motion. A singular cable configuration enables easy installation in and removal from various container and cargo configurations.

4 Claims, 4 Drawing Figures

ADJUSTABLE CONTAINER BULKHEAD ASSEMBLY

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to improvements in intermodal shipping containers, and more particularly to a novel cargo restraint system for securing less-than-container load shipments in containers of various configurations and sizes.

Containerized shipping has reached a high degree of standardization and automation resulting in more rapid loading and unloading cycles and reduced cargo handling, pilferage, and damage. Because of these advantages, containerized shipping has seen tremendous growth in the shipping industry and is extensively used for naval overseas supplies. The merchant fleet is continuing to expand its containerized fleet while the number of break bulk ships is diminishing. In order for the Navy to continue in its use of the merchant fleet for transport of its supplies, improved methods and apparatus for handling and shipping containerized cargo are required.

The centerpiece of containerized shipping is the intermodal shipping container designed to transport the cargo by one or more modes of transportation (road, rail, ship or air) without intermediate handling. These containers come in numerous configurations and designs and would require an enormous Navy inventory to meet all anticipated loading demands. Such an inventory would be further compounded by the fact that each container type has its own unique restraint system for less-than-containerload shipments. Cargo restraint systems of the prior art usually require substantial installation time because they use fittings such as tracks and rails extensively secured to the container by welding, riveting or numerous types of fasteners. A large inventory of parts and fittings adequate to meet all anticipated load configurations would therefore be required even where the restraint system can be installed and adjusted at loading time. In the overall, such an inventory is economically and logistically impractical.

SUMMARY OF THE INVENTION

Accordingly, it is an object of the present invention to provide a universal cargo restraint system which can be easily and quickly installed in, or removed from, a large variety of shipping containers regardless of shape or size, to positively secure cargo, particularly in less-than-containerload shipments. Another object is to provide a cargo restraint system which will minimize container and restraint system inventories, and reduce loading and unloading time. Still another object is to provide a cargo restraint system which can be economically installed in a container and removed after only one usage, which reduces dunnage and the time necessary to position and trim the cargo in the container. A still further object is to provide a restraint system which is capable of uniformly distributing high dynamic forces imparted within the container, and which improves safety to both the handling personnel and cargo.

Briefly, these and other objects and aspects of the present invention are achieved by a novel and improved universal cargo restraint system in which four cables are respectively anchored to the corners of the shipping container forward wall and extend rearwardly to threaded rods passing through the corners of a movable rear bulkhead which is formed to engage the rearward surfaces of cargo modules. The rear bulkhead is compressed against the cargo by bolts adjustable along the threads of the rods. Dunnage positioned between sides of adjacent cargo modules and along the sides of the container provide sway bracing. Separator gates between ends of adjacent cargo modules and front bulkheads lined along the forward wall provide to and fro bracing.

For a better understanding of these and other objects and aspects of the invention, reference is made to the following detailed description taken in conjunction with the accompanying drawings wherein:

DESCRIPTION OF THE PREFERRED EMBODIMENT

Figure 1:
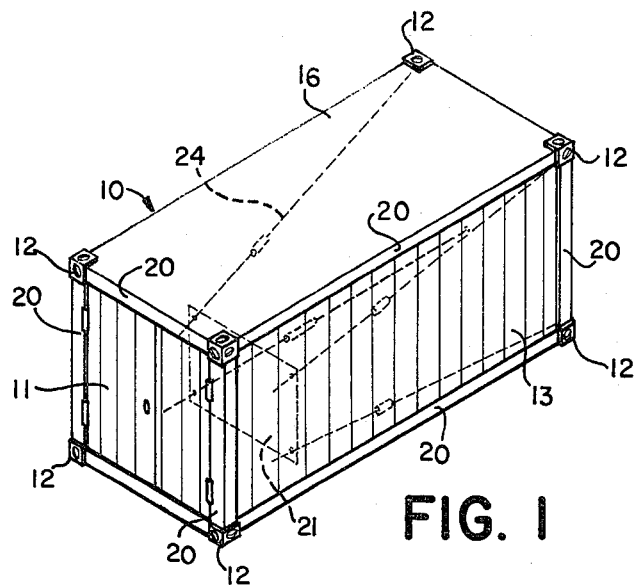
FIG. 1 is an isometric view of a typical intermodal shipping container including in dotted outline a cargo restraint system according to the invention.
Figure 2:
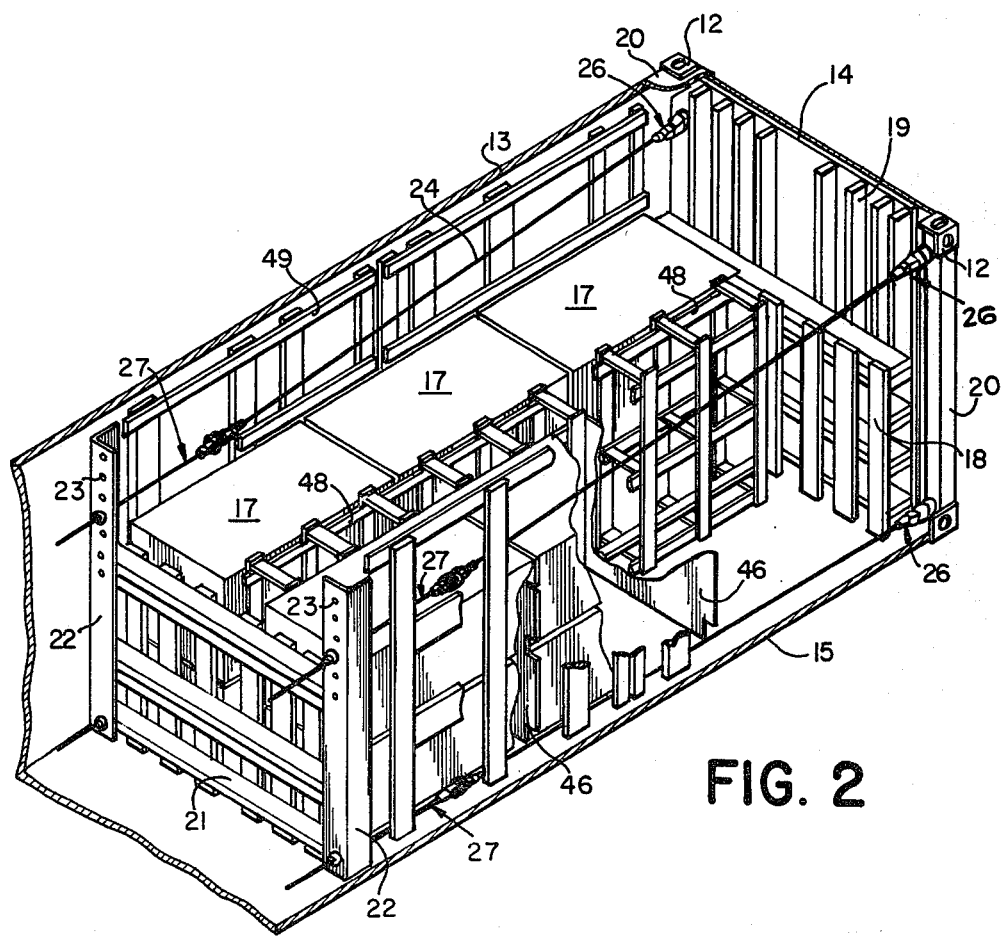
FIG. 2 is a more detailed isometric view of the cargo restraint system of FIG. 1 with portions of the container, cargo and system cut away for clarity.

Referring now to FIG. 1, there is shown a typical intermodal shipping container 10 as applied to a universal cargo restraint system according to the invention. The container is of rectangular configuration internally accessible through rear doors 11. The edges are reinforced with vertical and horizontal members 20 joined at each corner of container 10 by a lift fitting 12. Holes formed in fitting 12 provide for attachment to mating fittings the sling of a crane or similar material handling equipment, not shown. Side panels 13, front panel 14 and bottom and top panels 15 and 16 secured to members 20, together with doors 11, provide total enclosure of cargo modules 17.

The forwardmost modules 17 are urged against an auxiliary bulkhead 18 which in turn is supported in spaced relation from front panel 14 by a front bulkhead 19. These bulkheads, in combination, provide uniform distribution of the loading forces over the front wall area. Bulkhead 18 is preferably constructed of laminated 2×6 or 2×8 vertical and horizontal wood members nailed together to form unitary assemblies. The number and location of the wood members are determined by the configuration and weight of the cargo. Bulkhead 19 is also constructed of 2×6 or 2×8 vertical wood members horizontally spaced by additional members not shown. The two vertical members at either side of bulkhead 19 are positioned near the ends of the horizontal members of the bulkhead 18 to insure that the loading forces are transferred into the strong reinforcing members 20 along the vertical edges of front panel 14.

Cargo modules 17 are urged forwardly by a movable rear bulkhead 21 also comprising horizontal and vertical wood members of size and construction similar to auxiliary bulkhead 19. The number and location of the members are selected to suit the particular configuration and weight of the modules 17 being retained. The ends of the horizontal members of bulkhead 21 engage two rigid vertical endposts 22 at either side which in turn are urged forwardly by four restraint cables 24. One end of each cable 24 is secured to one of members 20 at a respective corner of front panel 14 by a cable anchor assembly 26, and the other end at a corresponding position adjacent to modules 17 to one of the endposts 22 by an adjustable rod assembly 27.

Figure 3:
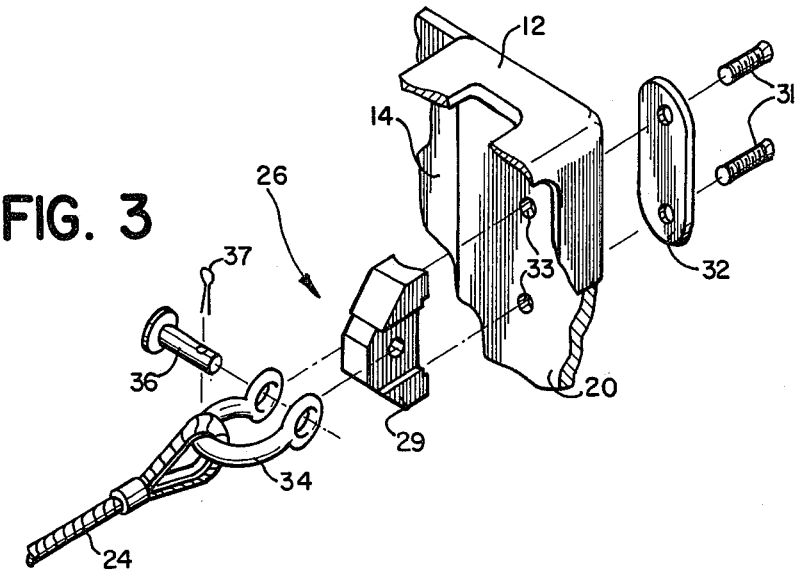
FIG. 3 represents an exploded view of a cable anchor assembly of the restraint system of FIG. 2.
Figure 4:
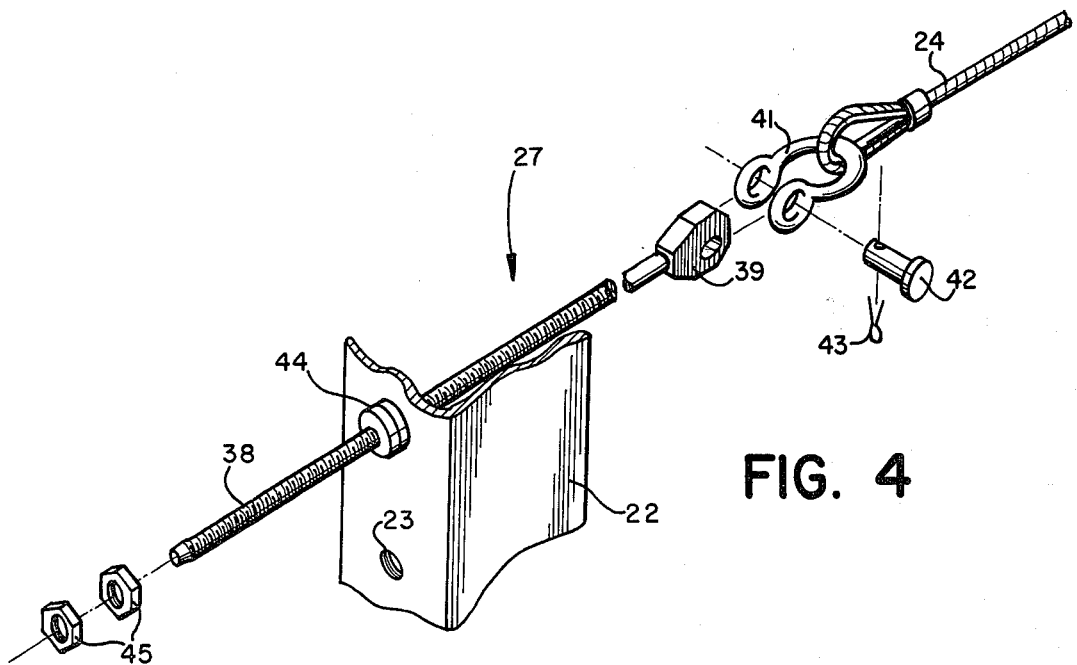
FIG. 4 represents an exploded view of an adjustable rod assembly of the restraint system of FIG. 2.

As shown in the details of FIG. 3, cable anchor assembly 26 includes an anchor block 29 secured to the container front wall by bolts 31 extending through back-up plate 32 and holes 33. A shackle 34, and pins 36 and 37 secure a swaged loop formed at the end of cable 24 to block 29. As shown in the details of FIG. 4, the adjustable rod assembly 27 includes a threaded rod 38 extending through one of a plurality of spaced holes 23 in endpost 22. A shackle fitting 39 is connected to a swaged loop at the other end of cable 24 by a shackle 41, and pins 42 and pin 43. The position of endpost 22 along the length of threaded rod 38 is determined by position of rear bulkhead 21 when compressed against the cargo. Each rod 38 passes through a hole 23 selected to ensure the least bending moment to posts 22 without interfering with cargo placement. Bulkhead 21 is maintained in position by adjustment of nuts 45 against washers 44 on rod 38. Preferably, washers 44 have spherical surfaces at holes 23 to accomodate angular displacement of rod 38 relative to the endpost 22.

Additional bracing along the length of the container 10 for cargo modules 17 is accomplished by wood separator shims 46 between adjacent modules 17. Lateral bracing is provided by dunnage 48 and side bulkheads 49, preferably constructed of wood members in like manner as bulkheads 18, 19 and 21.

Installation of the restraint system in an intermodal container is as follows. Holes 33 are drilled at appropriate locations in the four corners of the container front wall for mounting blocks 29. The cable anchor assemblies 26 are installed and the cables 24 connected and interimly positioned along the side perimeters of container 10. Cargo is then loaded in any designated fashion, with front and side bulkheads 19 and 49, dunnage 48 and shims 46 as may be required for uniform distribution of loading forces. Rear bulkhead 21 and endposts 22 are positioned against the cargo, adjustable rod assemblies 27, extending through the appropriate holes 33 of endposts 22, are connected to cables 24 and secured by nuts 45. The loaded container 10 is now ready for transport.

It is contemplated, of course that wide acceptance of the present invention may lead to intermodal containers having holes or anchor fittings preformed in the front panel of the container obviating the need to drill holes for the anchor assembly 26.

Some of the many advantages and novel features of the invention should now be apparent. For example, a universal restraint system is provided for easy and quick attachment to or removal from a large variety of intermodal shipping containers. This is possible because the reinforced corners of conventional containers are rigid and capable of accepting the forces necessary for maintaining a cargo restraint bulkhead under normal loading conditions. Being of simple design, the system reduces the necessity for maintaining a large inventory of both containers and restraint systems, and can be easily installed and removed for individual loadings. The system particularly lends itself to less-than-containerload shipments while allowing the use of dunnage when desired. It is far less expensive to manufacture and install then prior art restraint systems, and is economically and logistically suitable for one-time usages.

It will be understood that various changes in the details, steps and arrangement of parts, which have been herein described and illustrated in order to explain the nature of the invention, may be made by one skilled in the art within the principle and scope of the invention as expressed in the appended claims.

What is claimed is:

1. A universal restraint system for positively securing a cargo comprising, in combination:
   an intermodal shipping container having an exterior front panel with reinforcing members along the vertical edge thereof, said members having holes formed at the respective corners of said panel communicating between the interior and exterior of said panel;
   rear bulkhead means movable along the length of the container having a bearing surface formed to engage the rearward surface of the cargo; and
   a plurality of cable restraint means, each having one end extending through respective ones of said holes and releasably secured to the exterior of said panel, and the other end connected to one of a plurality of corresponding vertically spaced positions of said bulkhead means, and operatively connected to said members for adjusting the position of said bulkhead along the length of said container for maintaining said bulkhead against the cargo.

2. A universal restraint system according to claim 1, wherein:
   said bulkhead means includes a plurality of vertically and horizontally secured members for uniformly distributing the loading force over the cargo, and post means abutting to said secured members and receiving said other ends of said cable means.

3. A universal restraint system according to claim 2, wherein:
   said other end of said restraint means includes a threaded rod extending through said post means, and a nut threadingly connected to said rod for adjusting the position of said post along the length thereof.

4. A universal restraint system according to claim 3, wherein:
   said restraint means further includes a spherical washer on said rod interposed between each of said nuts and said post means for permitting angular displacement between said rod and said post means.

* * * * *